United States Patent [19]
Wright

[11] Patent Number: 5,003,586
[45] Date of Patent: Mar. 26, 1991

[54] DIAL TONE INTERRUPT DEVICE

[75] Inventor: Gregory J. Wright, Flowermound, Tex.

[73] Assignee: Siecor Corporation, Hickory, N.C.

[21] Appl. No.: 430,640

[22] Filed: Nov. 2, 1989

[51] Int. Cl.$^5$ .............................................. H04M 1/66
[52] U.S. Cl. ..................................... 379/200; 379/399
[58] Field of Search .................. 379/8, 2, 32, 33, 188, 379/199, 200, 387, 412, 399, 442, 445; 307/241, 246, 247.1, 570, 594, 600, 605; 331/1, 11, 112, 113 R, 113 A, 113 S

[56] References Cited

U.S. PATENT DOCUMENTS

| | | | |
|---|---|---|---|
| 3,867,588 | 2/1975 | Pickens et al. | 379/8 |
| 4,885,768 | 12/1984 | Genin | 379/200 |
| 4,924,499 | 5/1990 | Serby | 379/200 |

*Primary Examiner*—James L. Dwyer
*Attorney, Agent, or Firm*—Roy B. Moffitt

[57] ABSTRACT

A device for preventing calls from a network interface device, disposed between a customer's premise equipment and that portion of a telephone loop owned by a telephone company connecting the network interface device to a telephone central office, by periodically disconnecting that portion of the telephone loop owned by the telephone company from the subscriber's premises equipment every few seconds. An unauthorized person can get dial tone and can attempt to dial a number, but before the called party can answer, the line is disconnected. Dial tone will appear again after a given period of time, the cycle of dial tone-no dial tone continuing indefinitely. A premise owner may test the integrity of the loop between the owner's premises and the central office in a conventional manner notwithstanding.

14 Claims, 4 Drawing Sheets

DIAL TONE INTERRUPT DEVICE

BACKGROUND OF THE INVENTION

With the advent of the deregulation of the telephone system in the United States, many conceptual changes have been required and are yet to be required in both telephone equipment and services, not the least of which is the identity of the party responsible for the repair and maintenance between equipment owned by subscriber (subscriber premise equipment) and telephone company-owned telephone outside equipment. The telephone subscriber, for instance, may now own his own telephone, premise wiring, PABX's, and other associated equipment, the maintenance of which is the sole responsibility of the premise owner.

Recent rulings by the FCC require that a device (network interface device) be installed on the premises of each subscriber that will permit testing of the integrity of that part of the subscriber loop owned by the telephone company. The rationale behind this rule is to provide a means that a subscriber may use to avoid a telephone service charge arising out of a subscriber complaint regarding faulty telephone service in those instances where the faulty service is in that portion of the subscriber loop belonging to the telephone company. By use of the invention shown in U.S. Pat. Nos. 4,488,008 and/or 4,741,032, the contents of which are incorporated herein by reference, either a subscriber and/or a telephone service person may unplug a previously connected jack and plug located in a network interface device, insert another plug connected to an operating telephone and if a call can be made using such an arrangement or dial tone heard, that portion of the subscriber loop owned by the telephone company is without fault and thus the fault must be in the premise wiring or equipment of the owner. The telephone subscriber may perform this testing function for himself and thus avoid a service call charge for trouble that is within that part of the subscriber loop owned by the subscriber and for which the subscriber is responsible.

In most cases, the network interface devices described by the above-identified United States Patents are disposed on the outside of a customer's premise, or they may be disposed in a common area of a multi-family dwelling unit such as an apartment house. Because of this public or semi-public location, they may be subject to abuse. Unauthorized individuals need only to access the interior of the network interface device, remove the plug of the network interface device from its jack, insert a plug connected to a telephone handset, as if a test of the telephone loop owned by the telephone company were to be performed, and make a telephone call, either local or toll, the charge for such call being lodged against the customer without his permission, knowledge, or blessing. It is in the context of this problem where the present invention is most useful.

BRIEF DESCRIPTION OF THE INVENTION

The disclosed invention is a device for preventing calls from a network interface device disposed between a customer's premise equipment and that portion of the telephone loop owned by the telephone company which connects the telephone network interface device to a telephone central office. The invention periodically disconnects every few seconds that portion of the telephone loop from the telephone network interface device to the central office. A person can get dial tone and attempt to dial a number, but before the called party can answer, the line is disconnected. The interval can be long enough for a person to complete a call, but not be able to talk for any length of time. Dial tone will appear again after a given period of time, the cycle of dial tone and no dial tone continuing indefinitely. Anyone may test the integrity of the loop between the owner's premise and the central office in a conventional manner notwithstanding.

DETAILED DESCRIPTION OF THE INVENTION

Figure 1:
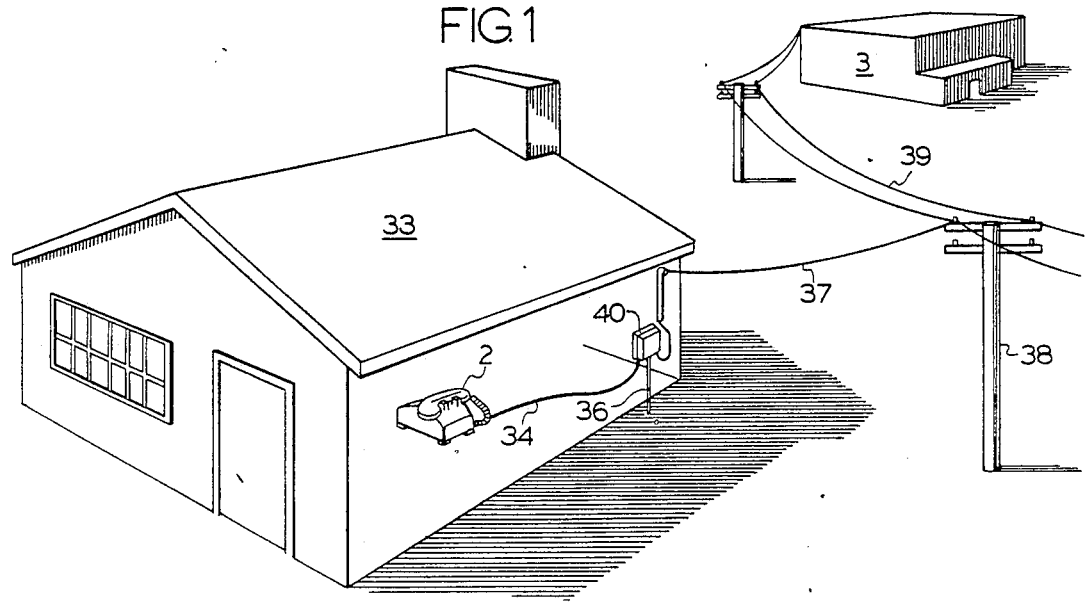
FIG. 1 is a diagrammatic sketch of a subscriber's premise and the telephone company-owned portion of a telephone subscriber loop.

In FIG. 1 there is shown a diagrammatic sketch of a subscriber premises and the telephone company owned portion of the subscriber loop. It is also a diagrammatic view of the subscriber loop of FIGS. 2 and 3. Telephone handset 2 is connected by line cord 34 to box 40 which contains the network interface device, more fully described in U.S. Pat. No. 4,488,008 and 4,741,032 referred to above. The network interface device in box 40 is electrically connected to ground by means of wire 36 and to drop wire 37, which is connected to telephone line 39, ultimately connected to central office 3. Element 38 represents a telephone pole which supports both drop wire 37 and telephone line 39.

Figure 2:
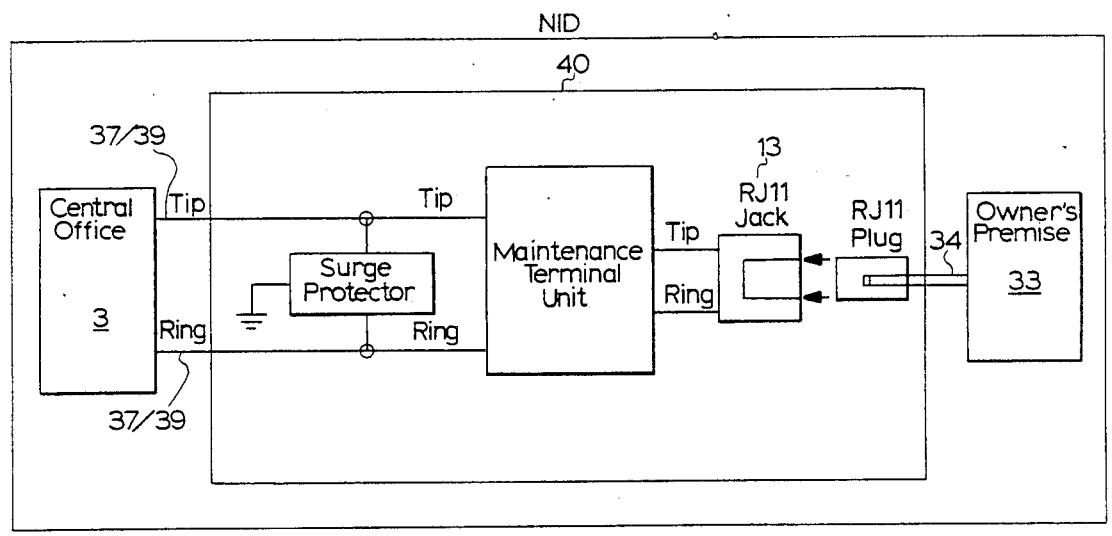
FIG. 2 is a schematic diagram of a prior art telephone subscriber loop using a network interface device, a maintenance terminal unit (MTU), and a surge protector, the network interface device employing a state of the art RJ11 jack and plug.

Turning now to FIG. 2, there is shown in this drawing a prior art telephone subscriber loop employing a network interface device NID circuit. RJ11 plug is Item 13 of FIG. 2, of U.S. Pat. No 4,741,032 and the RJ11 jack is Item 12 of the same Figure. The RJ11 plug connects the premise wiring to the central office wiring, which terminates at the RJ11 jack. To test the loop or make a toll call, only a standard household telephone with an RJ11 plug attached to the end of its line cord and a screw driver is needed. Once inside the NID, the RJ11 plug (Item 13) is unplugged, disconnecting the subscriber from the central office. The household phone is then plugged in via its RJ11 jack, connecting it to the central office wiring. Calls can be made at will at that point by using normal dialing procedures. When calls are finished, the NID can be restored to its original condition by reversing the above steps, the innocent premise owner being none the wiser.

Figure 3:
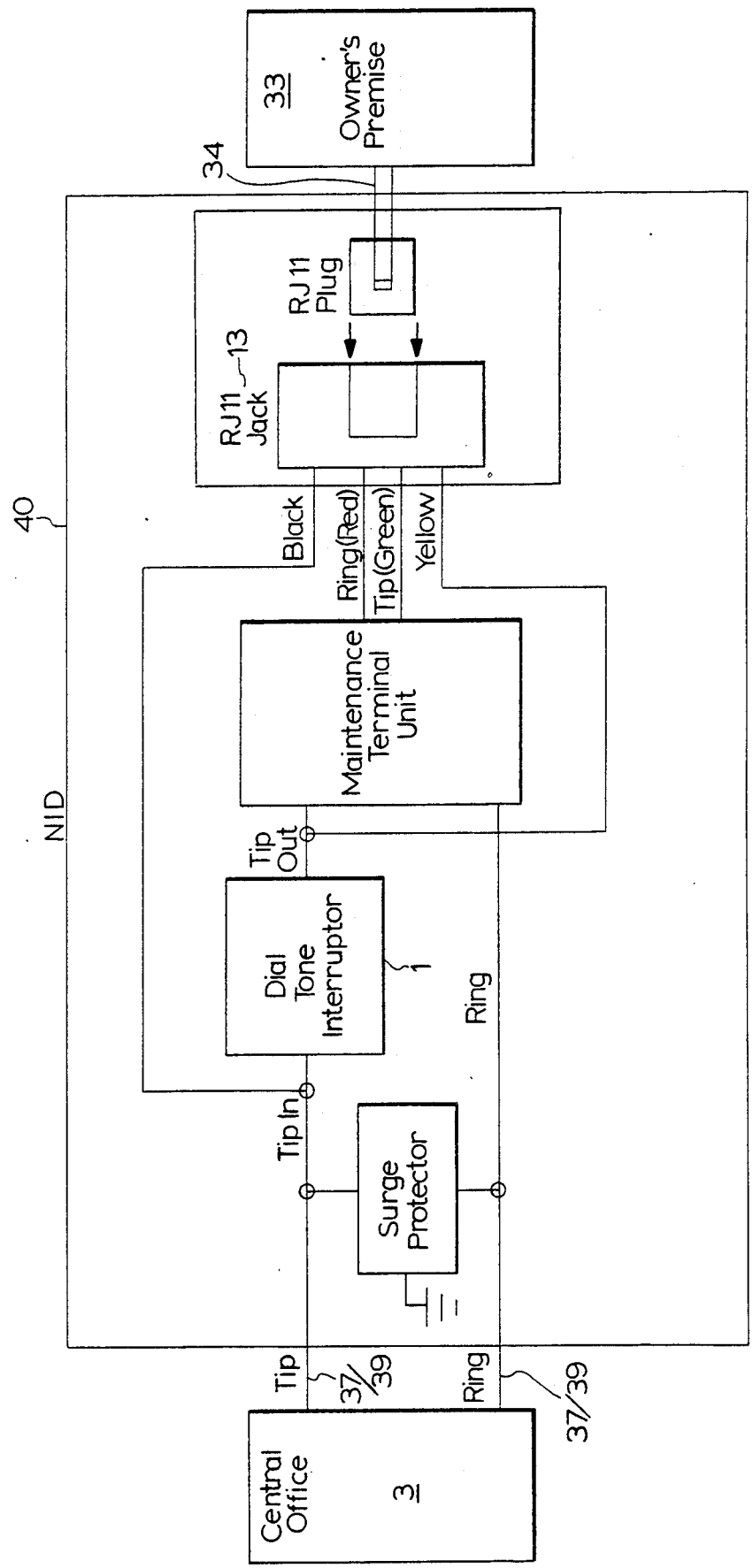
FIG. 3 is a schematic diagram of a telephone subscriber loop employing the same equipment shown in FIG. 2, but with a dial tone interrupter, the subject of the present invention.

FIG. 3 shows the addition of a dial tone interrupter to a prior art NID, more specifically, the addition of element 1 to that apparatus shown in FIG. 2. Note the addition of yellow and black wires, not used in the apparatus of FIG. 2. There are several forms of RJ11 jacks and plugs. Normal household jacks and plugs have only red and green wires, which are the ring and tip wires respectively. Other types of jack and plug are the same physical size, but have two additional wires, yellow and black. The prior art NID, shown in FIG. 2, uses a two-wire version of the jack and plug. The network interface device employing the present invention uses a four-wire version of the jack and plug. This can be seen in FIG. 3. The dial tone interrupter 1 is a series device that is inserted in the tip leg of the telephone loop.

Figure 4:
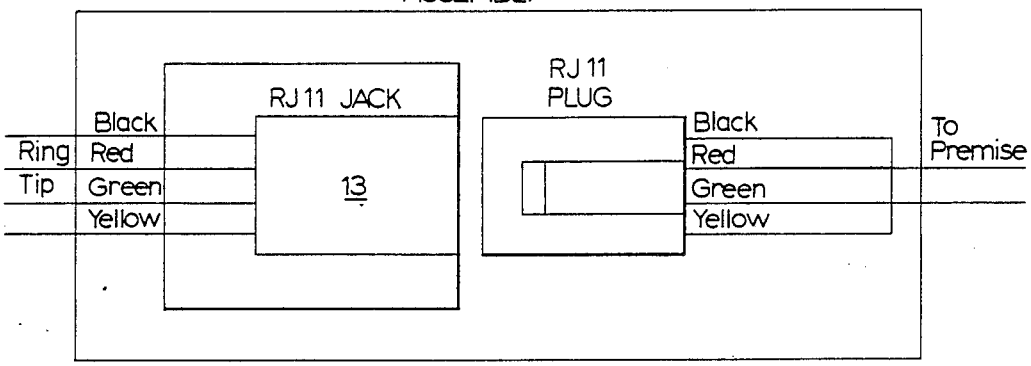
FIG. 4 is a schematic representation of a RJ11 jack and plug, commonly referred to as a jack top assembly employed in the telephone loops as shown in FIGS. 2 and 3.

The yellow and black wires of the plug going to the premises are shorted together and hidden from view inside the NID. This is shown in FIG. 4. In this arrangement, the plug to the premises wiring (the plug of the NID) acts as a key that shorts out the dial tone interrupter 1 when the RJ11 plug to the premises wiring is plugged into the test jack. Only the red and green wires will go to the premise itself. In this way, normal service is provided to the premise when the four-wire plug is inserted into the four-wire jack. The protection is activated (dial tone interrupter 1 put into the circuit) when the premise plug is removed from the test jack, which removes the short across the dial tone interrupter 1. Any standard phone that is plugged into the test jack will not have the black and yellow wires connected to anything. Therefore, plugging a standard phone into the test jack will not deactivate the dial tone interrupter 1.

FIG. 3 is a schematic representation of the invention in its intended environment. Telephone central office 3 is connected by the usual tip and ring to the subscriber's telephone 2 shown in FIG. 1.

Figure 5:
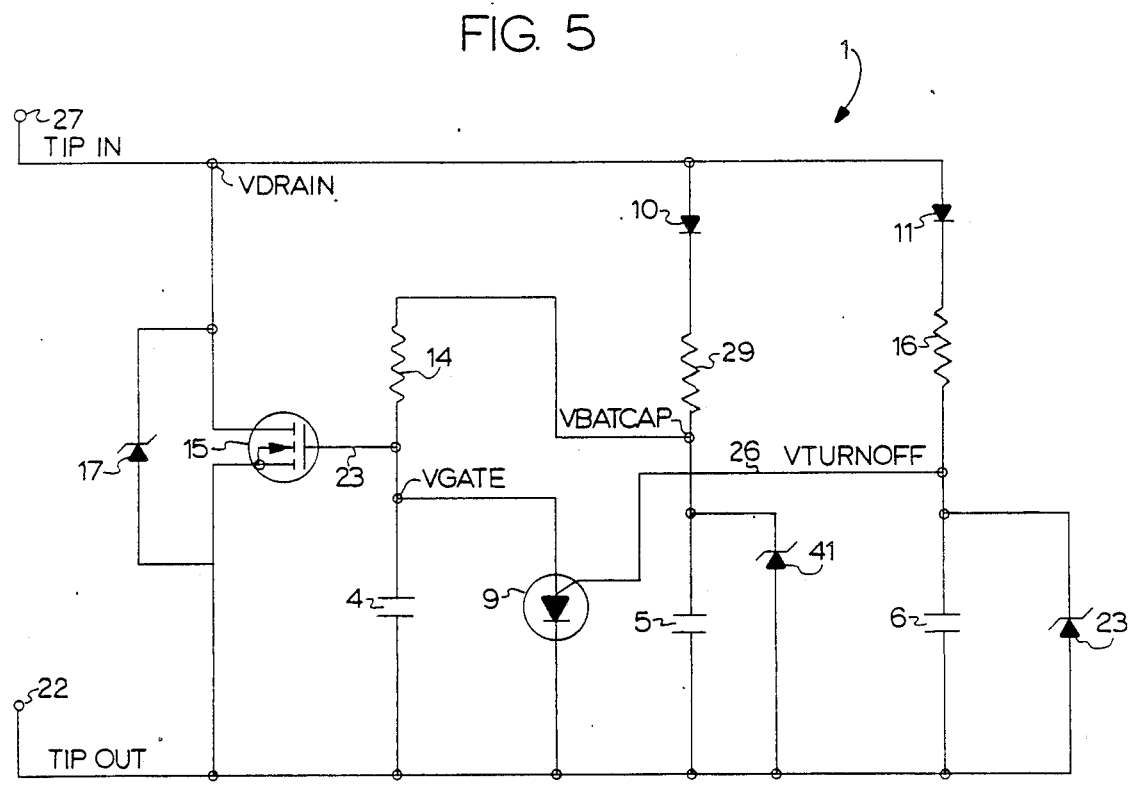
FIG. 5 is a schematic diagram of a dial tone interrupt device (1) used in the network interface device shown in FIG. 3.

Reference is now made to the dial tone interrupter 1 of FIG. 5. Phone 2 of FIG. 1 is connected to field effect transistor 15 through leads 22 and 27. Vdrain is the voltage of field effect transistor (FET) 15. Zener 17 bridges FET 15 as shown. The gate of FET 15 is connected by lead 23 to resistor 14 and capacitor 4 as shown. Vgate is connected to the anode of programmable unijunction transistor 9 as shown. Transistor 9 is connected through its gate by lead 26 to Vturnoff, to diode 23, to capacitor 6, and resistor 16 as shown.

Diode 10 is connected to resistor 29 to capacitor 5 as shown. Diode 41 bridges capacitor 5. Capacitor 6 is bridged by diode 23 and is connected further to resistor 16 and diode 11 as shown. Resistor 16 can have a value of 100 K ohms, resistor 14 a value of 10 megaohms and resistor 29 a value of 100 k. Diode 41 may be a 1N969B 22V type, diode 23 may be a 1N759A 12V type, diode 11 and diode 10 may be a IN4001 type, and diode 17 may be a SA60A type.

Figure 6:
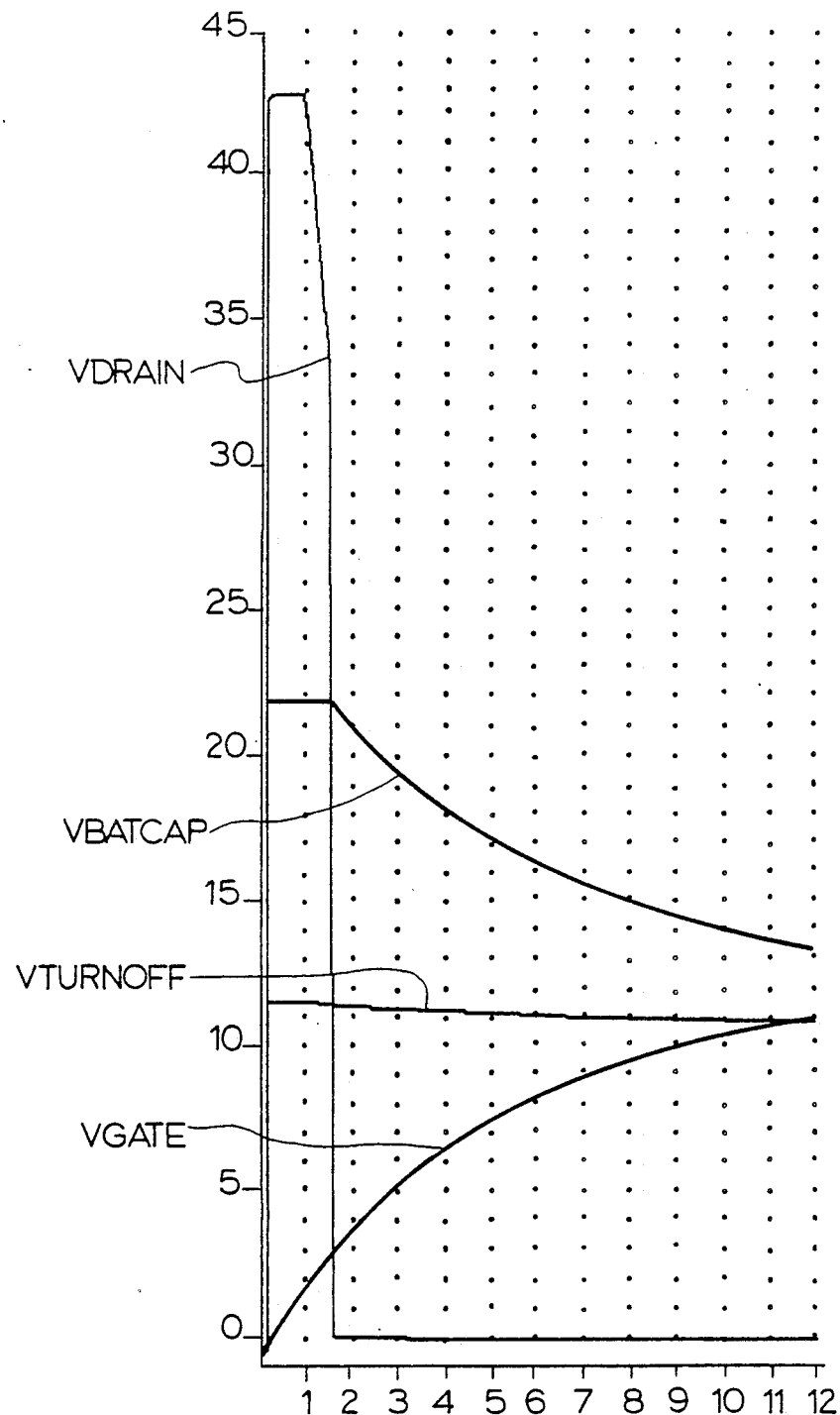
FIG. 6 is a voltage wave form for (Vdrain); (Vturn off); (Vbat cap) and (Vgate) of FIG. 5, all such voltages are measured with reference to node 22 (TIP out).

Operation of the circuit is as follows. Referring to FIGS. 3, 4, 5, and 6 of this disclosure, the RJ11 plug is removed from the RJ11 jack and an unauthorized telephone handset connected to a line cord and plug is then inserted into the RJ11 jack by inserting the plug into the RJ11 jack. When this unauthorized telephone handset goes off hook, in an attempt to make an unauthorized telephone call from the network interface device, Transistor 15 is initially turned off and the voltage Vdrain is at about 43 volts. Voltages Vdrain, Vbatcap, Vgate, and Vturnoff are all measured with respect to node 22. As a result capacitors 5 and 6 will charge rapidly due to the low time constants they have with resistors 29 and 16 respectively. Capacitor 5 will clamp to about 22 volts due to zener 41 and capacitor 6 will clamp to about 12 volts due to zener 23. Diodes 10 and 11 will be forward biased at this time. Capacitor 4 will start to charge through resistor 14 by the voltage across capacitor 5. This is depicted by voltage waveform Vgate in FIG. 6. When Vgate reaches about three volts, transistor 15 will turn on and the voltage Vdrain will drop to close to zero volts. At this point, Capacitors 5 and 6 will still be fully charged. Diodes 10 and 11 will back bias preventing the discharge of capacitors 5 and 6 through transistor 15. The amount of time transistor 15 stays on is determined by charge - discharge curves of capacitors 4, 5, and 6. The charge - discharge curves of capacitors 4 and 5 and 6 are depicted by voltage waveforms Vgate, Vbatcap, and Vturnoff respectively and are shown in FIG. 6. Capacitor 5 will continue to charge capacitor 4 through resistor 14, but will itself start to discharge because it is no longer being charged through resistor 29 because diode 10 is now back biased. Therefore, Vgate will rise and Vbatcap will fall. Vturnoff, which is the voltage across capacitor 6, will decline only slightly due to leakage through diode 23, diode 11, and the programmable unijunction transistor 9. Transistor 18 will stay on until Vgate exceeds Vturnoff. When Vgate exceeds Vturnoff enough to deliver enough current to PUT transistor 9 to fire it, capacitor 4 and 6 will discharge themselves through transistor 9. When Vgate reaches about one volt, FET Ml will turn off and Vdrain will rise to 43 volts again. Diodes 10 and 11 will forward bias again and capacitors 5 and 6 will start charging again. Transistor 9 will turn off due to the lack of anode current to compensate for its increasing gate current. The circuit is now back in its initial state and will repeat this cycle as long as the phone is off hook or until the plug of the unauthorized telephone handset is removed from the jack. Effectively, this circuit causes the person listening to the phone to hear dial tone for about 10 seconds, followed by about one second of silence. Such silence arises out of FET Ml being in the "off" state. The "off" state of FET Ml will insure that the line will disconnect and any completed phone call will terminate. This cycle will be repeated as long as one cares to listen.

The timing elements (capacitors 4, 5, and 6) of the above described circuit are disconnected from power when field effect transistor 15 turns on and the timing function is performed by internally stored energy of the timing elements themselves.

What is claimed is:

1. A disconnect device for preventing telephone calls from being made from a network interface device that periodically disconnects a customer's premise equipment for a predetermined period of time and then reconnects the customer's premise equipment to a telephone subscriber loop, the network interface device containing a jack in electrical communication with said disconnect device and a plug for mechanical and electrical engagement with said jack, said disconnect device comprising:

(a) a first capacitor and a normally "off" first transistor connected in electrical communication with said first capacitor, said first transistor responsive to be turned "on" by the charging of the first capacitor; and, (b) second and third capacitors, in electrical communication with said first transistor and to a second transistor, said second capacitor for charging said first capacitor, said first capacitor responsive to a discharge from said second capacitor to turn on said first transistor causing any voltage across said first transistor to decrease and said first and third capacitors to discharge through said second transistor.

2. The disconnect device of claim 1 further including a normally "off" second transistor, connected to said first transistor and said first and third capacitors, said normally "off" second transistor responsive to the charging of said first capacitor and the discharging of said second capacitor and is turned on at a predetermined voltage established at said third capacitor and while turned on, drains the charge off the first and third capacitors to the extent that the second transistor is no longer responsive to said first and third capacitors and returns to its normally off state.

3. The disconnect device of claim 1 further including a means for electrically disconnecting said disconnect device from said network interface device in response to said plug of said network interface device becoming electrically engaged with the jack of said network interface device.

4. The disconnect device of claim 3 wherein said second transistor is a programmable unijunction transistor and said first transistor is an FET type transistor.

5. The disconnect device of claim 4 further including a resistor in electrical communication with said first and second capacitors and said second capacitor is in electrical communication with the anode of said second transistor through said resistor to provide continuing charging of the first capacitor after said first transistor has been turned on.

6. The disconnect device of claim 5 wherein said third capacitor is in electrical communication with the gate of said second transistor to provide a threshold voltage at which said second transistor will be activated by the voltage of the first capacitor to drain any charge from said first and third capacitors and to cause said second transistor to return to its "off" state.

7. The disconnect device of claim 6 further including first and second diodes, said first diode in electrical communication with said second capacitor and said second diode in electrical communication with said third capacitor.

8. A disconnect device comprising:
(a) a plug for mechanical and electrical engagement with a jack and a jack in electrical communication with:
(b) a first capacitor and a normally "off" first transistor connected in electrical communication with said first capacitor, said first transistor responsive to be turned "on" by the charging of the first capacitor; and,
(c) second and third capacitors, in electrical communication with said first transistor and to a second transistor, said second capacitor for charging said first capacitor, said first capacitor responsive to a discharge from said second capacitor to turn on said first transistor causing any voltage across said first transistor to decrease and said first and third capacitors to discharge through said second transistor.

9. The disconnect device of claim 8 further including a normally "off" second transistor, connected to said first transistor and said first and third capacitors, said normally "off" second transistor responsive to the charging of said first capacitor and the discharging of said second capacitor and is turned on at a predetermined voltage established at said third capacitor and while turned on, drains the charge off the first and third capacitors to the extent that the second transistor is no longer responsive to said first and third capacitors and returns to its normally "off" state.

10. The disconnect device of claim 8 further including a means for electrically disconnecting the elements of sub-paragraphs (b) and (c) of claim 8 response to the plug becoming electrically engaged with the jack.

11. The disconnect device of claim 10 said second transistor is a programmable unijunction transistor and said first transistor is an FET type transistor.

12. The disconnect device of claim 11 further including a resistor in electrical communication with said first and second capacitors and said second capacitor is in electrical communication with the anode of said second transistor through said resistor to provide continuing charging of the first capacitor after said first transistor has been turned on.

13. The disconnect device of claim 12 wherein said third capacitor is in electrical communication with the gate of said second transistor to provide a threshold voltage at which said second transistor will be activated by the voltage of the first capacitor to drain any charge from said first and third capacitors and to cause said second transistor to return to its "off" state.

14. The disconnect device of claim 13 further including first and second diodes, said first diode in electrical communication with said second capacitor and said second diode in electrical communication with said third capacitor.

* * * * *